United States Patent
Alekseenko

(10) Patent No.: US 8,331,459 B2
(45) Date of Patent: Dec. 11, 2012

(54) METHOD AND APPARATUS FOR SMOOTH DIGITAL MEDIA PLAYBACK

(75) Inventor: Nikolay Alekseenko, Nizhny Novgorod (RU)

(73) Assignee: Intel Corporation, Santa Clara, CA (US)

(*) Notice: Subject to any disclaimer, the term of this patent is extended or adjusted under 35 U.S.C. 154(b) by 1442 days.

(21) Appl. No.: 11/904,142

(22) Filed: Sep. 26, 2007

(65) Prior Publication Data

US 2009/0080539 A1    Mar. 26, 2009

(51) Int. Cl.
*H04N 7/52* (2006.01)
(52) U.S. Cl. .................... 375/240.28; 375/371
(58) Field of Classification Search ............... 375/240.28
See application file for complete search history.

(56) References Cited

U.S. PATENT DOCUMENTS

| | | | | |
|---|---|---|---|---|
| 5,596,420 A * | 1/1997 | Daum | | 386/241 |
| 5,598,352 A * | 1/1997 | Rosenau et al. | | 715/203 |
| 5,652,627 A * | 7/1997 | Allen | | 348/497 |
| 6,018,376 A * | 1/2000 | Nakatani | | 375/240.28 |
| 6,208,643 B1 * | 3/2001 | Dieterich et al. | | 370/389 |
| 6,598,172 B1 * | 7/2003 | VanDeusen et al. | | 713/503 |
| 6,873,629 B2 * | 3/2005 | Morris | | 370/535 |
| 6,952,521 B2 * | 10/2005 | Kelly et al. | | 386/290 |
| 6,970,526 B2 * | 11/2005 | Min | | 375/354 |
| 7,050,460 B1 * | 5/2006 | Eckart et al. | | 370/473 |
| 7,352,959 B2 * | 4/2008 | Yamashita | | 386/343 |
| 7,574,102 B2 * | 8/2009 | Kelly et al. | | 386/278 |
| 7,711,011 B2 * | 5/2010 | Choi et al. | | 370/535 |
| 7,735,111 B2 * | 6/2010 | Michener et al. | | 725/146 |
| 7,779,340 B2 * | 8/2010 | Milne et al. | | 714/799 |
| 7,797,685 B2 * | 9/2010 | Agarwala et al. | | 717/128 |
| 7,885,340 B2 * | 2/2011 | Greenbaum et al. | | 375/240.28 |
| 7,885,366 B2 * | 2/2011 | Fuchikami et al. | | 375/371 |
| 2003/0066094 A1 * | 4/2003 | van der Schaar et al. | | 725/151 |
| 2005/0018775 A1 * | 1/2005 | Subramanian et al. | | 375/240.25 |
| 2005/0244140 A1 * | 11/2005 | Blacquiere | | 386/116 |
| 2008/0007653 A1 * | 1/2008 | Mori et al. | | 348/462 |
| 2008/0279272 A1 * | 11/2008 | Saito et al. | | 375/240.01 |
| 2009/0003432 A1 * | 1/2009 | Liu et al. | | 375/240.01 |
| 2009/0296741 A1 * | 12/2009 | Kizuka et al. | | 370/487 |
| 2010/0046634 A1 * | 2/2010 | Dai et al. | | 375/240.25 |

* cited by examiner

*Primary Examiner* — Ricky Ngo
*Assistant Examiner* — Ben H Liu
(74) *Attorney, Agent, or Firm* — Trop, Pruner & Hu, P.C.

(57) ABSTRACT

In one embodiment of the invention, an apparatus may comprise a memory to receive original video data that includes a continuity of time stamps and a discontinuity of time stamps. A processor may shift a first time stamp from the continuity of time stamps to the discontinuity of time stamps by an adaptively modified distance and play the shifted time stamp in a smooth fashion.

12 Claims, 4 Drawing Sheets

METHOD AND APPARATUS FOR SMOOTH DIGITAL MEDIA PLAYBACK

BACKGROUND

In systems where digital data is encoded by an encoder, transmitted in packets of digital data, and decoded by a receiver, the encoder may receive data that includes digital samples of analog signals. The encoder groups the samples into packets for transmission to a decoder. The encoder places time stamp data in the packets. The time stamp data represents the value of the encoder clock at various intervals, so that the decoding and encoding can be synchronized. In hardware decoders (for example, set-top boxes) the clock values represented in the time stamps are used to synchronize the decoder clock with the clock used to encode the data. Different time stamps may be used, for example, to indicate presentation time (the time at which a packet should be rendered (played), decode time (the time at which a packet should be decoded), and the reference value of the encoder system clock (at the time the data packet is created)). These time stamps are known as presentation time stamps (PTS), decoding time stamps (DTS), and system clock references (SCR).

When there is a break or discontinuity in the series of PTS, media playback may suffer. For example, an initial (i.e., starting) video frame may begin with a non-zero PTS while the audio frame begins with a 0 PTS. Such a situation can occur, for example, when a video stream is cut from another video stream and the initial position of the cut stream does not coincide with a key-frame (e.g., I frame). Consequently, in streams containing video and audio, one can hear audio but the picture is static (e.g., a blank screen) until playback time reaches the PTS of the first video frame. During presentation of the static picture, audio may continue thereby frustrating the viewer. Skipping the audio data that precedes the first video PTS is also frustrating to the viewer.

BRIEF DESCRIPTION OF THE DRAWINGS

The accompanying drawings, incorporated in and constituting a part of this specification, illustrate one or more implementations consistent with the principles of the invention and, together with the description of the invention, explain such implementations. The drawings are not necessarily to scale, the emphasis instead being placed upon illustrating the principles of the invention. In the drawings.

DETAILED DESCRIPTION

The following description refers to the accompanying drawings. Among the various drawings the same reference numbers may be used to identify the same or similar elements. While the following description provides a thorough understanding of the various aspects of the claimed invention by setting forth specific details such as particular structures, architectures, interfaces, and techniques, such details are provided for purposes of explanation and should not be viewed as limiting. Moreover, those of skill in the art will, in light of the present disclosure, appreciate that various aspects of the invention claimed may be practiced in other examples or implementations that depart from these specific details. At certain junctures in the following disclosure descriptions of well known devices, circuits, and methods have been omitted to avoid clouding the description of the present invention with unnecessary detail.

Figure 1:
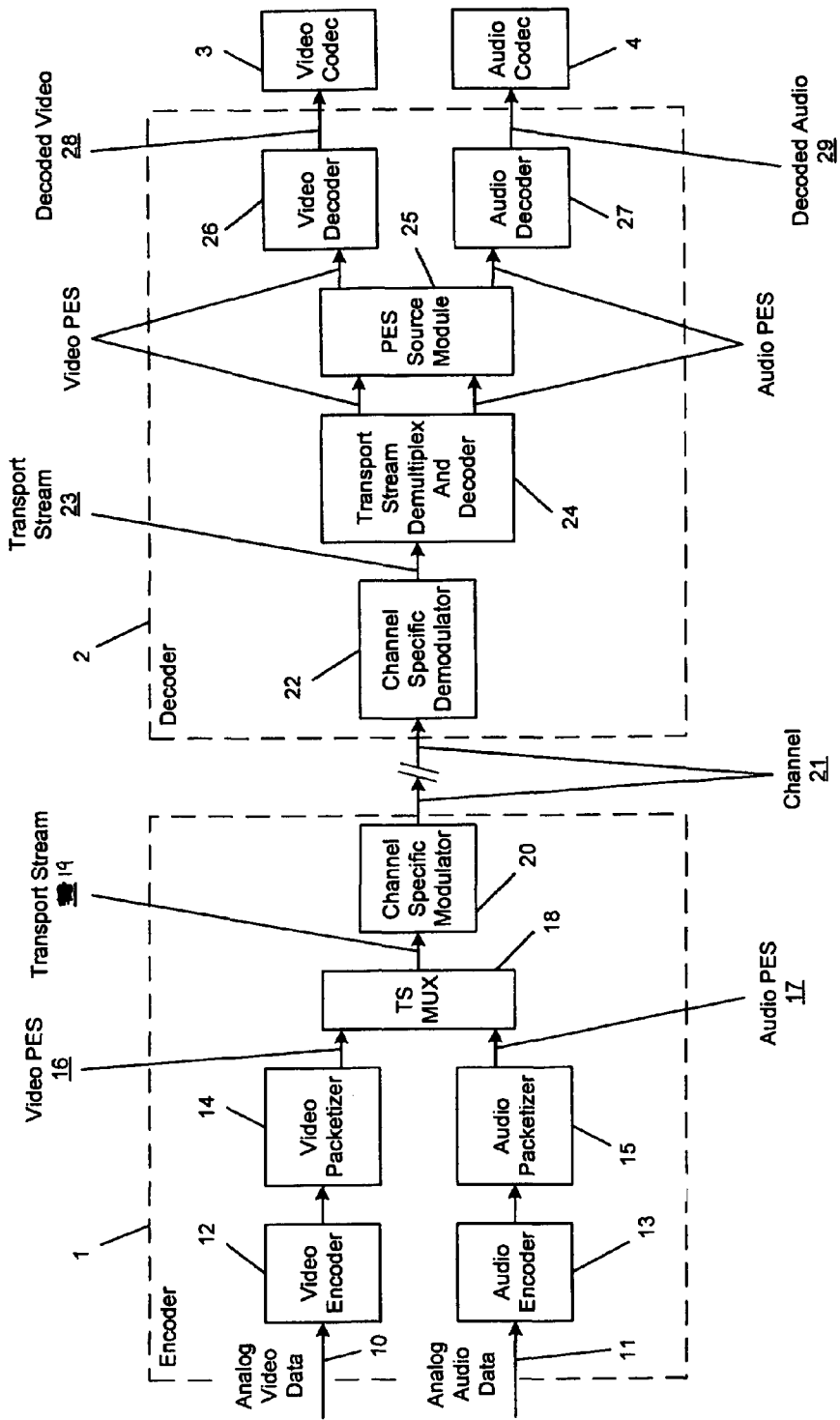
FIG. 1 is a block diagram of a system for encoding, transmitting, receiving, decoding, and playing digital audio and video data in one embodiment of the invention.

A system for encoding, transmitting, and decoding digital data is shown in FIG. 1. The system may encode audio and video data and transmits the data (for example, via a network, such as the Internet or a cable network; or via a wireless system, such as a radio signal broadcast system). The operation of systems of the type shown in FIG. 1 is further described in Generic Coding of Moving Pictures and Associated Audio: Systems, Recommendation H.222.0, ISO/IEC 13818-1, Apr. 25, 1995 ("MPEG 2 Specification"). The system may include an encoder 1 side and a decoder 2 side. The encoder 1 may receive video 10 and audio 11 data (e.g., the analog audio and video output of a movie player). A video encoder 12 and an audio encoder 13 may each include a coder/decoder ("codec") and software for sampling the data to create digital audio and video data, according to standard analog to digital conversion techniques such as, for example, those used in pulse code modulation systems. The encoded digital data may then be passed to audio 15 and video 14 packetizers (e.g., software modules) that may prepare the data for transmission by dividing it into packets and inserting a packet header at the beginning of the packet. The information in the headers may include data indicating the beginning and length of a packet, time stamp data, and other data helpful to the decoder 2 side. The output of each packetizer may be a packetized elementary stream (PES), that is, a stream of packetized digital data. The video PES 16 and audio PES 17 may each be output to a transport stream multiplexer 18.

The transport stream multiplexer 18 may combine programs with one or more independent time bases into a single stream 19. The transport stream 19 may be designed, for example, for use in environments where errors are likely, such as storage or transmission in lossy or noisy media. The transport stream may be sent to a channel-specific modulator 20, which modulates data by converting it into a form that can be transmitted via a channel to a decoder (e.g., a carrier signal).

A channel of encoded digital data 21 may be transmitted to the decoder side 2 (e.g., via a network, such as the Internet; a wireless system, such as a radio signal broadcast system; or a cable network). The channel 21 may be input into a channel-specific demodulator 22, for example a hardware device or a software module, that decodes the channel 21 into a transport stream 23, as described in the MPEG Specification. A transport stream demultiplex and decoder 24 may be, for example, a software module designed to decode the transport stream 23 into a video PES and an audio PES. The audio and video PESs 16, 17 may be output to a PES source module 25, which may adjust the time stamps of the PESs 16, 17, and may output the video PES 16 to a video decoder 26 and the audio PES 17 to an audio decoder 27. The video and audio decoders 26, 27 may be, for example, software modules designed to decode the digital video and audio data, e.g., using codecs. The decoder modules 26, 27 may decode and convert the digital data into decoded video 28 frames and decoded audio 29 samples that are output to components of the computer system for converting to playable analog signals (e.g., audio and video codecs 3,4) and playing them to a user (e.g., speakers, monitor—not shown).

In one embodiment of the invention, an algorithm may compensate for the break or discontinuities in PTSs by using interpolating PTSs along a finite segment. Doing so may achieve smooth playback of the media.

Figure 2:
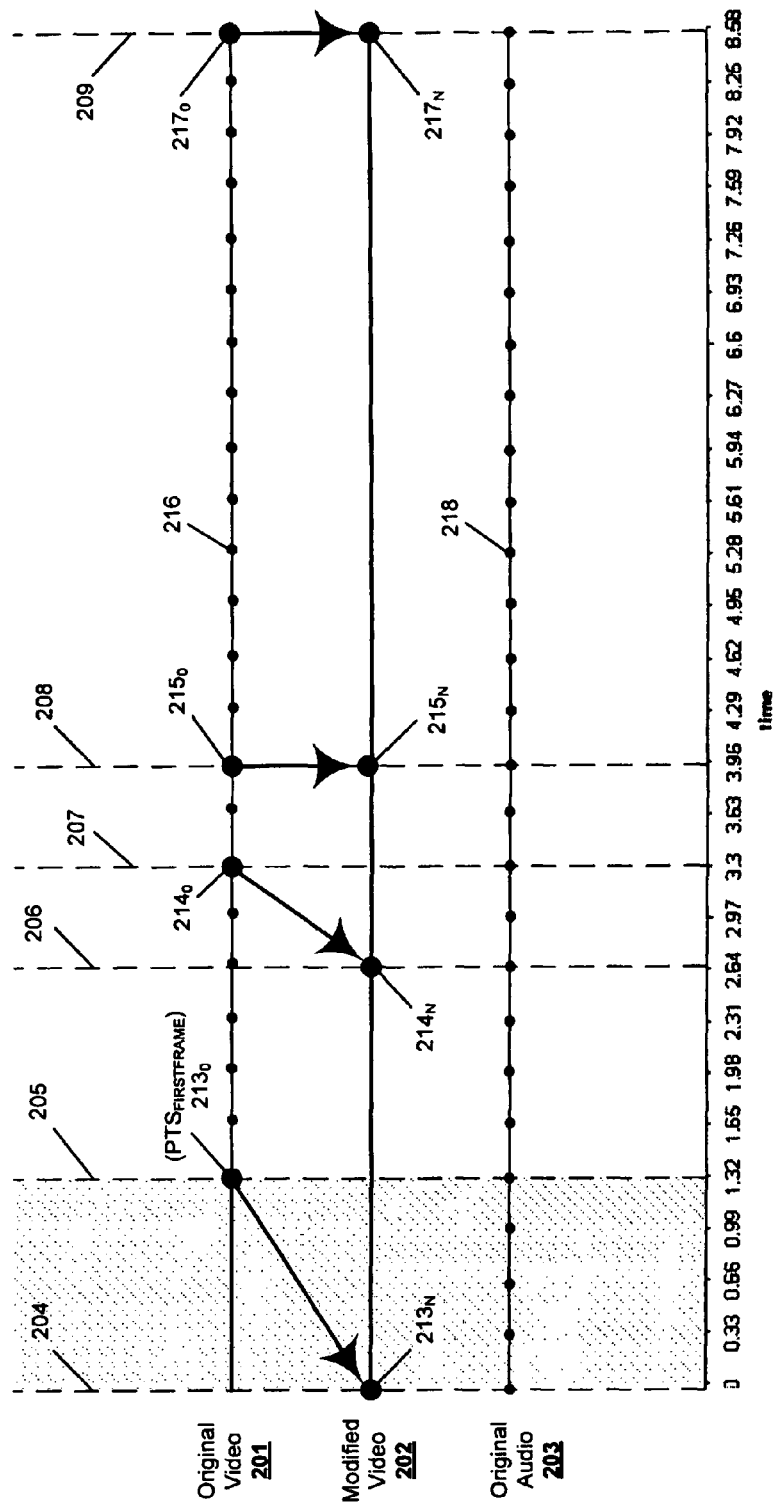
FIG. 2 is a graph of digital media data in one embodiment of the invention.

FIG. 2 is a graph 200 of digital media data in one embodiment of the invention. Lines 204, 205, 206, 207, 208, 209 are shown merely for illustrative purposes and do not represent actual data. Original video data 201 is depicted along with original audio data 203. In some instances, the PTSs of original video data 201 and original audio data 203 are synchronized, such as the PTSs 216, 218 located at PTS "5.28." Original video data 201 includes a continuity of PTSs between, for example, lines 205 and 209. However, original video data 201 also includes a PTS break or discrepancy between dashed lines 204 and 205 or between PTS "0" and PTS "1.32." As mentioned above, this discontinuity could be due to stream slicing or other similar factors that result in, for example, a lack of synchronicity between audio and video data.

In one embodiment of the invention, linear interpolation or some other numerical method, process (e.g., algorithm) may be used to create modified video data 202 wherein various PTSs are inserted or located in the PTS discontinuity. For example, PTSs may be shifted from the continuity of PTSs (i.e., PTS "1.32" to PTS "8.58") into the aforementioned PTS discontinuity. As will be described more fully below, linear interpolation or some other numerical method may be used to distribute some or all of the PTSs from segment [$213_o, 215_o$] into segment [$213_N, 215_N$]. In other words, linear interpolation or some other numerical method may be used to distribute PTSs from segment [$PTS_{FirstFrame}$, X] to segment [0, X], where $PTS_{FirstFrame}$ is the first PTS $213_O$ located after the PTS discrepancy located between lines 204, 205 in the original video data 201.

In one embodiment of the invention, a finite segment is derived. The finite segment may include the PTS discontinuity as well as PTSs from the continuity of PTS in the original video data 201. The segment may include the region where PTSs are to be redistributed. For example, the finite segment may be empirically derived as Segment=(3)*(PTS discontinuity). For example, the PTS discontinuity in FIG. 2 is 1.32. Thus, the segment over which PTS will be newly distributed is (3)*(1.32)=3.96. PTSs in original video 201 that follow PTS "3.96" will not be affected but those between "1.32" and up to "3.96" may be slid or modified in modified video 202 to smooth the PTS discontinuity of original video 201. This segment may be arrived at empirically or by other methods and is not limited to (3)*(PTS discontinuity).

In one embodiment of the invention, the redistribution occurs as follows. PTS $213_O$ ($PTS_{FirstFrame}$) is changed to PTS $213_N$ located at PTS "0". The last PTS in the segment $215_O$ is not changed in the new video data 202 but is merely noted as $215_N$. Regarding the newly distributed PTSs between $213_N$ and $215_N$ in one embodiment of the invention, those are determined as follows: $Y_{new}=4/3*(Y_{old}-X)$. For example, $214_N=4/3*(214_O-213_O)$ or $2.64=4/3*(3.3-1.32)$. Applying this algorithm to PTSs in the predetermined segment (e.g., "0" to "3.96") may result in modified video 202 with PTSs evenly and smoothly distributed throughout the segment. Changed PTSs are adaptively shifted and have different levels of correction according to their proximity to the discontinuity (e.g., "1.32") and the end of the predetermined segment (e.g., "3.96"). For example, $213_N$ will be shifted more dramatically than $214_N$. $215_N$ is not shifted at all.

Figure 3:
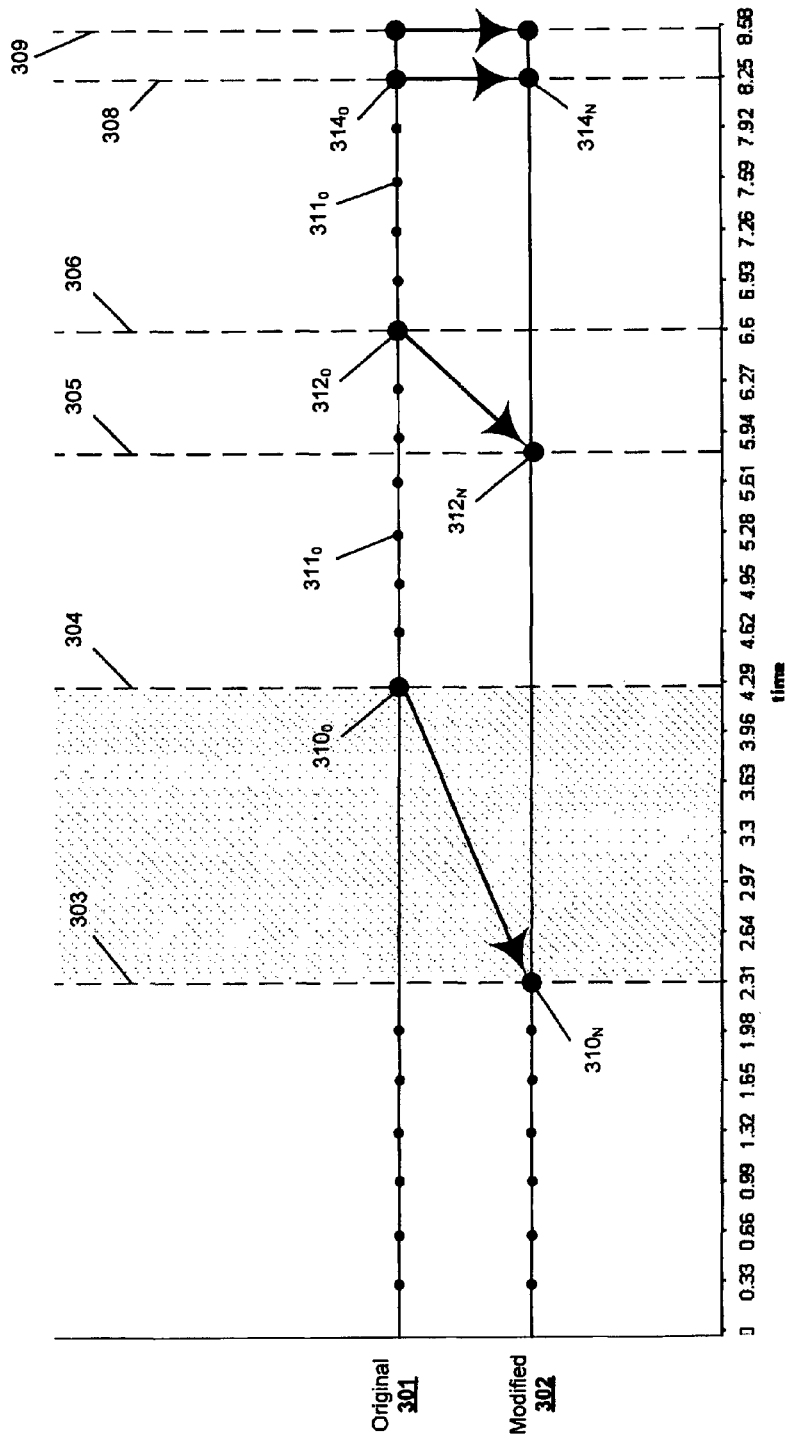
FIG. 3 is a graph of digital media data in one embodiment of the invention.

FIG. 3 is a graph 300 of digital media data in one embodiment of the invention. Lines 303, 304, 305, 308, 309 are shown merely for illustrative purposes and do not represent actual data. Original video data 301 is depicted along with modified video data 302. Original video data 301 includes a continuity of PTSs between, for example, PTS "0" and PTS "1.98" and another continuity between PTS "4.29" and "8.58". However, original video data 301 also includes a PTS break or discrepancy between dashed lines 303 and 304 or between PTS "2.31" and PTS "4.29".

In one embodiment of the invention, linear interpolation or some other numerical method, process (e.g., algorithm) may be used to create modified video data 302 wherein various PTSs are inserted or located in the PTS discontinuity. In one embodiment of the invention, a finite segment is derived. As stated above, the finite segment may include the PTS discontinuity as well as PTSs from the continuity of PTS in the original video data 201. For example, the finite segment may again be empirically derived as Segment=(3)*(PTS discontinuity). For example, the PTS discontinuity in FIG. 3 is (4.29)−(2.31)=1.98. Thus, the segment over which PTS will be newly distributed is (3)*(1.98)=(5.94)+(2.31)=8.25. PTSs in original video 301 that follow PTS "8.25" will not be affected but those between "4.29" and up to "8.25" may be slid or modified in modified video 302 to smooth the PTS discontinuity of original video 301. This segment may be arrived at empirically or by other methods and is not limited to (3)*(PTS discontinuity).

In one embodiment of the invention, PTS $310_O$ is changed to PTS $310_N$ located at PTS "2.31". The last PTS in the segment $314_O$ is not changed in the new video data 302 but is merely noted as $314_N$. Regarding the newly distributed PTSs between $310_N$ and $314_N$ in one embodiment of the invention, those are determined as follows: $Y_{new}=(4*(Y_{old}-(X-PTS_{start}))-PTS_{start})/3$, where $PTS_{start}=(PTS_{prev\ frame}+FrameDuration_{prev})$. For example, $PTS_{start}=(2.31+(2.31-1.98))=2.64$. Consequently, $Y_{new}=(4*(Y_{old}-(4.29-2.64))-2.64)/3$. For $Y_{old}(312_o)=6.6$, $Y_{new}=(4*(6.6-(4.29-2.64))-2.64)/3=5.72$ ($312_N$). Applying this algorithm to PTSs in the predetermined segment (e.g., "2.31" to "8.25") may result in modified video 302 with PTSs evenly and smoothly distributed throughout the segment. Changed PTSs are adaptively shifted and have different levels of correction according to their proximity to the discontinuity and the end of the predetermined segment. For example, $310_N$ will be shifted more dramatically than $312_N$. $314_N$ is not shifted at all.

This approach may smooth video playback and avoid or reduce video jitter, skips, or static images. The aforementioned inventive embodiments adaptively influence PTSs over the predetermined and adaptive segment size based on, for example, the PTS discontinuity size. The inventive embodiments can be used in media infrastructure components such as, without limitation, hardware and software video decoders, media parsers, and similar devices and methods that process media containers. The embodiments could improve media playback quality and may be used in set-top boxes, handheld devices, Intel® Viiv™ technology, Intel® Media Share Software, and the like.

Thus, in one embodiment of the invention, a memory may receive original video data that includes a continuity of presentation time stamps (PTS) and a discontinuity of PTSs. A processor, coupled to the memory, may shift (i.e., relocate, distribute, allocate, modify, amend) one or more PTSs from the continuity of PTSs to the discontinuity of PTSs by an adaptively modified distance. The distance may be based on the length of the discontinuity. The processor may then play the shifted PTSs. The shifted PTSs may be located in a new video segment or in a modified portion of an original video segment. The processor may also play the nonshifted PTSs, which may be located in an original video segment or a new video segment, in a smooth playback manner.

Various embodiments of the invention may be implemented in a computer program. As such, these embodiments may be stored on a storage medium having stored thereon instructions which can be used to program a computer system to perform the embodiments. The storage medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs), erasable programmable read-only memories (EPROMs), electrically erasable programmable read-only memories (EEPROMs), flash memories, magnetic or optical cards, or any type of media suitable for storing electronic instructions. Similarly, embodiments may be implemented as software modules executed by a programmable control device. A programmable control device may be a computer processor or a custom designed state machine. Custom designed state machines may be embodied in a hardware device such as a printed circuit board having discrete logic, integrated circuits, or specially designed application specific integrated circuits (ASICs).

Figure 4:
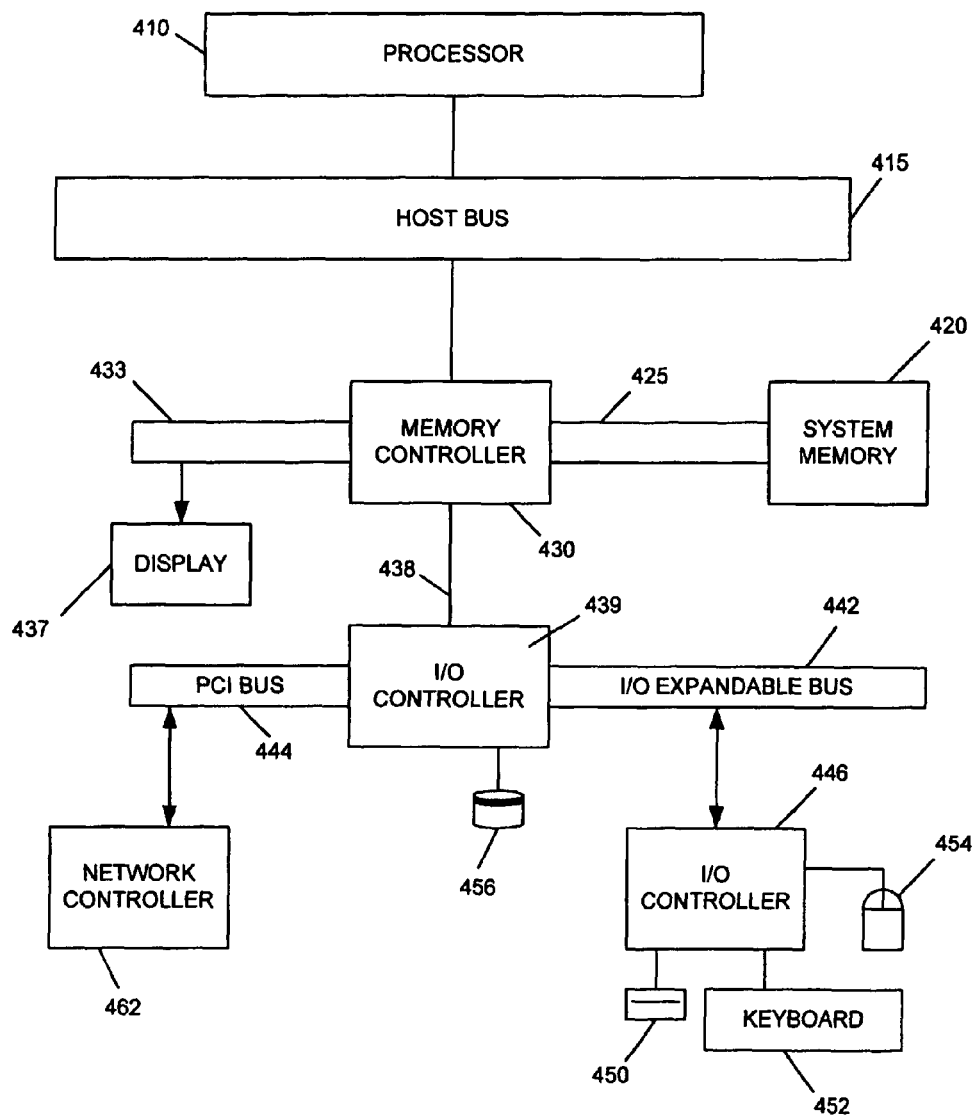
FIG. 4 is a system for implementing an embodiment of the invention.

FIG. 4 is a block diagram of a representative data processing system, namely computer system 400 with which embodiments of the invention may be used. In one embodiment, computer system 400 includes a processor 410, which may include a general-purpose or special-purpose processor such as a microprocessor, microcontroller, ASIC, a programmable gate array (PGA), and the like. The processor 410 may be coupled over a host bus 415 to a memory controller 430 in one embodiment, which may be coupled to a system memory 420 via a memory bus 425. The memory controller 430 may also be coupled over a bus 433 to a display 437.

The memory controller 430 may also be coupled (via a link 438) to an input/output (I/O) controller 439 that is coupled to an input/output (I/O) expansion bus 442. The I/O expansion bus 442 may be coupled to an I/O controller 446 that controls access to one or more I/O devices. These devices may include, in one embodiment of the invention, storage devices such as a disk drive 450 and input devices, such as keyboard 452 and mouse 454. The I/O controller 439 may also be coupled to, for example, a hard disk drive or server 456. Furthermore, the I/O controller 439 may be coupled to a PCI bus 444 and a network interface card (NIC) 462. Although the description makes reference to specific components of the system 400, it is contemplated that numerous modifications and variations of the described and illustrated embodiments may be possible.

While the present invention has been described with respect to a limited number of embodiments, those skilled in the art will appreciate numerous modifications and variations therefrom. It is intended that the appended claims cover all such modifications and variations that falls within the true spirit and scope of this present invention.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
receiving original video data that includes a continuity of presentation time stamps (PTS) and a discontinuity of PTSs;
shifting a first PTS from the continuity of PTSs to the discontinuity of PTSs by a first distance;
shifting a second PTS from the continuity of PTSs to the discontinuity of PTSs by a second distance, the first PTS and the second PTS both being originally located in a predetermined length immediately adjacent to the discontinuity of PTSs;
determining the predetermined length based on the length of the discontinuity of PTSs and
playing the shifted first PTS and the remaining continuity of PTSs.

2. The method of claim 1, further comprising adaptively determining the length of the first distance based on the length of a first discontinuity.

3. The method of claim 2, further comprising adaptively determining the length of the first distance based on a linear interpolation of the length of the first discontinuity.

4. The method of claim 1, further comprising shifting the first PTS and second PTS such that intervals between shifted PTSs in the discontinuity of PTSs are equidistant.

5. An apparatus comprising:
a memory to receive original video data that includes a continuity of time stamps (TS) and a discontinuity of TSs; and
a processor, coupled to the memory, to shift a first TS from the continuity of TSs to the discontinuity of TSs by a first distance and to play the shifted first TS and the remaining continuity of TSs;
wherein the processor is to shift a second TS from the continuity of TSs to the discontinuity of TSs by a second distance, the first TS and the second TS both being originally located in a predetermined length immediately adjacent to the discontinuity of TSs;
wherein the processor is to determine the predetermined length based on the length of the discontinuity of TSs.

6. The apparatus of claim 5, wherein the processor is to adaptively determine the length of the first distance based on the length of a first discontinuity.

7. The apparatus of claim 6, wherein the processor is to adaptively determine the length of the first distance based on a linear interpolation of the length of the first discontinuity.

8. The apparatus of claim 5, wherein the processor is to shift the first TS and second TS such that the intervals between the shifted TSs in the discontinuity of TS s are equidistant.

9. The apparatus of claim 5, wherein the discontinuity of TSs is located immediately before the continuity of TSs.

10. The apparatus of claim 9, wherein the discontinuity of TSs is located immediately before the continuity of TS s and immediately after an additional continuity of TSs.

11. The method of claim 1, wherein the first distance is unequal to the second distance.

12. The apparatus of claim 5, wherein the first distance is unequal to the second distance.

* * * * *